July 28, 1964
B. ROSEN
3,142,598
METHOD OF MAKING RESIN-IMPREGNATED GLASS
FIBER AUTOMOBILE LEAF SPRINGS
Filed Oct. 2, 1961
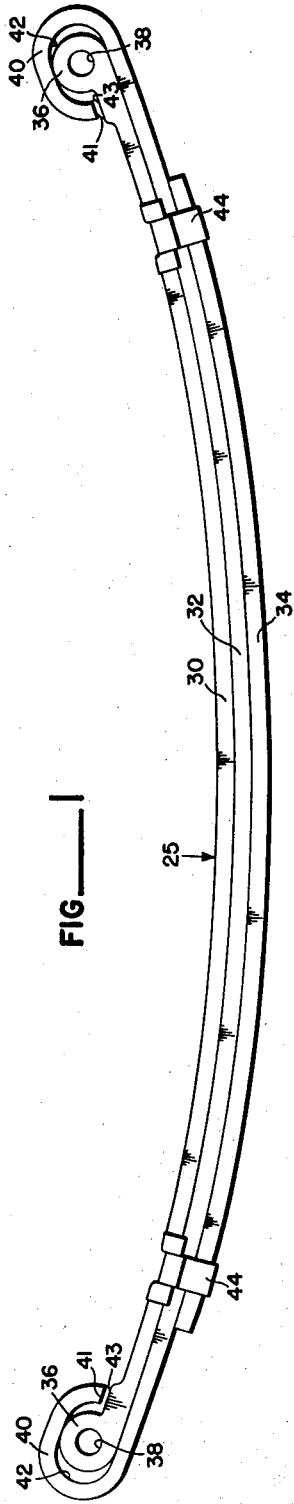
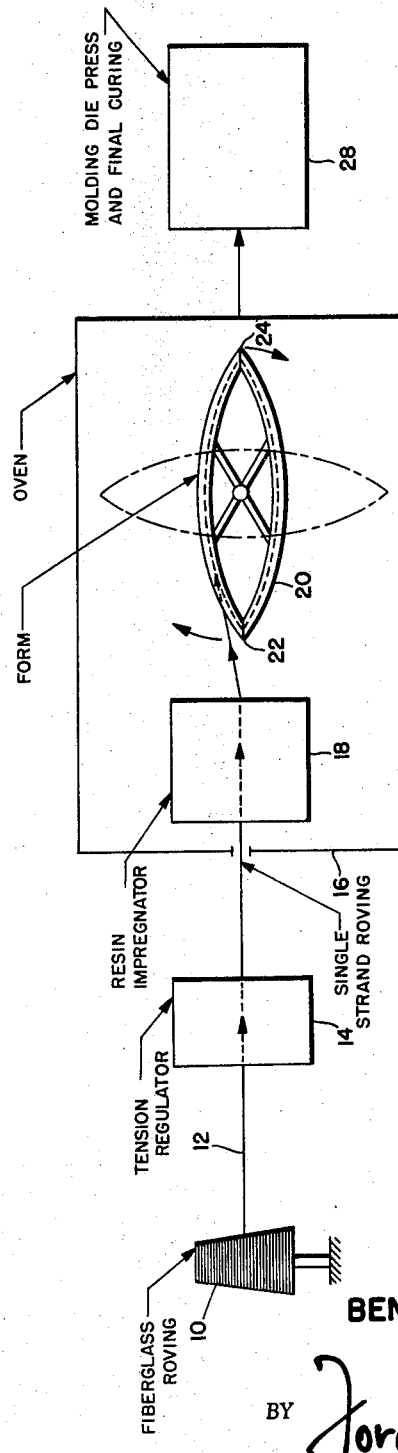
BEN ROSEN
INVENTOR.
BY Ford L. Smith _United States Patent Office_

3,142,598
Patented July 28, 1964

3,142,598
METHOD OF MAKING RESIN-IMPREGNATED
GLASS FIBER AUTOMOBILE LEAF SPRINGS
Ben Rosen, 4255 Glenmont Lane, Seattle, Wash., assignor of one-half to Pacific Plastics Company, Inc., Seattle, Wash., a corporation of Washington
Filed Oct. 2, 1961, Ser. No. 142,353
6 Claims. (Cl. 156—162)

This invention relates to a new and useful concept in a process for fabricating automobile leaf springs made of polyepoxide resin and plastic glass roving.

There has long been a wide interest in finding satisfactory non-metallic springs for automotive vehicles. Such interest has led to much experimentation with high strength plastics, but to date no method had been found which would result in a spring giving proper strength and flex characteristics without being unduly bulky. Thus, the problem facing applicant was whether a process utilizing known plastic materials could be developed which would yield a light weight, high strength, corrosion-resistant spring. Plastic glass fiber and polyepoxide resin were used because of the known high strength properties which inhere in these materials. It was found, however, that conventional methods for laying up fiberglass cloth laminates impregnated with polyepoxide resin failed to give the required strength and flexural characteristics in the finished product. The problem of inadequate characteristics was found to be due to the dual direction of the weave of standard types of fiberglass cloth and to the manner of laying up the laminates. Furthermore, the flow pattern of the resin at room temperature was not always uniform and a certain amount of squeeze-out resulted.

Work in this project ultimately led to the use of unidirectional glass fiber plastic reinforcement roving in which a continuous strand of roving was wound onto a forming mandrel having the radius of curvature or configuration of a spring. The mandrel was placed in a raised temperature atmosphere and the roving was tensioned. Also, the resin impregnation took place within the heated atmosphere. It was found that such a manner of producing the springs resulted in an article which answered to the required specifications.

Accordingly, it is an object of this invention to provide a process for producing a non-metallic automobile spring which contains all the mechanical properties of standard steel springs and yet which is lighter and non-corrosive.

Another object of this invention is to provide a process which entails impregnating and laying up the fiberglass and polyepoxide resin spring panel within a heated atmosphere.

Yet another object of this invention is to provide a process employing unidirectional fiberglass roving under tension and which is wound unidirectionally to the proper form to eliminate manufactured compressive and tensile stresses in the finished product.

Still another object of this invention is to provide a process which is time and labor saving and which involves such a novel combination of steps as to finally permit production of automotive springs from fiberglass and polyepoxide resin.

A further object of this invention is a process for producing a spring which does not have to be lubricated at any time through its useful life.

These, together with other objects and advantages which will become subsequently apparent, reside in the details of the process and its operation as more fully hereinafter described and claimed, reference being had to the accompanying drawings, forming a part hereof, wherein like numerals refer to like parts throughout, and in which:

FIGURE 1 is a schematic presentation of the step-by-step process for forming the springs; and FIGURE 2 is an elevational side view of a spring formed to a standard configuration.

Referring now to FIG. 2, it will be seen that the glass fiber plastic reinforcement roving is unwound from a spool 10 in a single strand 12. The fiberglass is preferably 60 end roving, though 30 end has been used successfully. Spool 10 is mounted so that tension will be required to unwind the roving therefrom. The roving itself is not the type used in preforming, i.e., short strands for preforming operations, but is instead that roving manufactured for use in filament winding processes. Roving for filament winding has the advantages of eliminating broken strands and of being more tightly compacted.

Tension on the roving may be applied in any manner desired though for purposes of illustration it is shown in FIG. 2 to be applied between the spool 10 and mandrel. A tension regulator 14 should be used, its logical location, of course, being outside the elevated temperature atmosphere.

Best results are obtained by applying about 15 pounds of pull on the 60 end roving. Expressed in other terms, a tension of ¼ pound per end seems to be optimum. Greater and lesser amounts of tension were applied to the roving but none were found to give as satisfactory results.

The departure of this process from presently known methods lies in the following steps. The tensioned roving is brought into a raised temperature atmosphere or oven 16 maintained at approximately 120° F. It is within the oven that the resin impregnation step 18 is accomplished. The 120° F. temperature represents the preferred heat value. Obviously, higher and lower temperatures may be used. Those skilled in the art will appreciate that if the temperature is higher that forming the leaf panels will have to be done more quickly in order to complete the panels before the initial layers of filament winding have cured to "B" stage.

It has been discovered that the most suitable polyepoxide resins are those which are the reaction product of bis-phenol A and epichlorohydrin. A resin which gives preferred results in this process is Shell Chemical Company's Epon 828 having the following properties:

Viscosity at 25° C. of 135–195 poises
Epoxide equivalent of 185–205
Average molecular weight of 350–400

Other polyepoxide resins have been used but were discarded in favor of Epon 828.

The Epon 828 is mixed with a standard aromatic polyamine curing agent. Shell Chemical's CL or metaphenylenediamine catalyst gives satisfactory results. However, it is found that the product known as Z Catalyst (also Shell Chemical Co.) is preferred. Such Z Catalyst is a mixture of metaphenylenediamine and methylene dianiline dissolved in a polyglicidyl ether solvent such as phenylglicidyl ether. A particularly appropriate curing agent mixture will contain 45 parts of metaphenylenediamine, 45 parts of methylene dianiline and 10 parts of phenylglicidyl ether.

The curing agent Z is added to the resin in the prescribed portions, usually in the amount of 20 parts per hundred of resin.

The roving is impregnated to give a ratio by weight of 70% glass to 30% resin in the finished product. Other ratios may be used but are not as satisfactory. Basically, the resin is added to give flexural characteristics to the spring. Resin impregnation of less than 30% by weight results in a too rigid spring and if too much less than the specified figure may result in delamination problems, On the other hand too high a ratio of resin to glass will result in a spring having too much flex.

It has been discovered that impregnating the tensioned roving in an oven maintained at a temperature of 120° F. gave a more uniform resin to glass ratio, a better flow pattern to the resin and the best bond between resin and glass. Furthermore, it has been found that the job of impregating could be accomplished more quickly than at room temperature.

The mandrel upon which the resin-impregnated roving is wound is also located within the oven. The entire winding operation is such that a prescribed number of revolutions of the mandrel will give a panel of the correct thickness. Speed of winding is dependent upon the characteristics of the resin-catalyst mix. The mandrel is provided with a form 20 which is built to the curvature required in the finished spring leaves. The proper number of layers of impregnated roving are wound on the form 20 and it must be remembered that the roving is at all times maintained under tension. The roving is maintained on the forming mandrel until the resin has set up to the "B" stage. It will be understood by maintaining the tension on the roving until the resin is partially cured that the resin itself holds the roving in a tensioned or prestressed condition when the panel is finally removed from the oven.

The panels, when wound on the forming mandrel, are actually made to a thickness slightly greater than the ½" dimension required in the finished leaf. The reason for such excess thickness will be apparent to those skilled in the art as necessary for the final press curing operation.

Removing the panel from the forming mandrel necessitates cutting the panel at the ends, as as 22 and 24. Thus, from each form 20 two unfinished leaf panels are taken.

The partially finished leaf panels are then placed in matched metal dies or molds for press curing, as shown by number 28. It should be noted that the panels are not wound to finish tolerances, but that they are trimmed after the final press cure. The individual panels are placed in dies and inserts are positioned at the ends of said panels in order to give the proper leaf configurations which will be discussed briefly with respect to FIG. 1. The dies, or molds, are heated to a temperature of 250–275° F. for a period of approximately 30 minutes under a pressure in excess of 50 p.s.i. Pressures to 2000 p.s.i. have been used, though pressure employed depends upon the extent of the "B" stage cure. Those skilled in the plastics forming arts will readily recognize that final curing time, temperature and pressure may be readily determined. When finally cured, the spring is removed, with the inserts left in place, and allowed to cool. After cooling, the inserts are removed and the leaves trimmed to allowed tolerances. The slight excess in thickness of the partially cured spring allows the final cure to press the leaves to the exact thickness and thereby give a smooth upper as well as a smooth under surface.

The above procedure was used to produce a leaf ½ inch thick, 2¾ inches wide and 43 inches long, formed to the proper radius of curvature. Each leaf thus produced answered to S.A.E. specifications using the modulus of elasticity of steel in being able to support 550 pounds with a 2 inch deflection. Tensile and compressive strength requirements are also satisfied. These particular specifications are those required for a "jeep" class vehicle, but the same processes can obviously be employed to produce leaf springs for other types of automotive and truck vehicles.

FIGURE 1 shows the design and configuration of a spring 25 produced by the process discussed above. Spring 25 has primary or top leaf 30 each end of which is provided with enlarged mounting head 36. Head 36 has a hole 38 extending therethrough for receiving a mounting bolt and bushing connected to the chassis of the vehicle. A secondary, or middle leaf 32 has a coiled arm 40 which extends upwardly and inwardly to provide a slightly elongated space 42. Arm 40 in coiling inwardly over the top surface does not completely enclose space 42 but has end 41 which is spaced from the upper surface of leaf 32. Space 42 envelops the generally round head 36 in such a manner as to permit leaves 30 and 32 to slide longitudinally relative to each other. Need for space on either side of head 36 is apparent since flexing causes relative slippage between leaves which requires that the ends of said leaves also move relative to each other. Thus, end 41 of arm 40 is very slightly spaced from the upper surface 43 of leaf 30 to eliminate any possible binding contact. While there is space on either side of head 36 for movement, arm 40 is designed so that it does contact the uppermost and lowermost points of said head. Hence it may be seen that each leaf is allowed complete freedom of longitudinal movement relative the other. A bottom or load rating leaf 34 is also provided. It has the same thickness and width dimensions as leaves 30 and 32 but is considerably shorter. Leaf 34 is flat with no end configuration and has the same radius of curvature as leaves 30 and 32.

All three leaves are held together by conventional-type retaining clip assemblies 44. Thus the leaves are held together and restrained against transverse movement relative to each other although freedom of longitudinal movement is permitted. The inserts spoken of in the final curing step are placed at the ends of the leaves to form the spaces 38 and 42 to the desired dimensions.

The foregoing is considered as illustrative only of the principle of this invention. Since numerous modifications and changes will readily occur to those skilled in the art, it is not desired to limit the invention to the exact process ranges and quantities shown and described, and accordingly all suitable modifications and equivalents may be resorted to, falling within the scope of the invention.

What is claimed is:

1. A process for the production of resin-impregnated glass fiber leaf springs possessing strength and flexibility characteristics adapting the same for automotive use without requiring excessive bulk comprising:
    (1) winding multifilament glass strand useful in filament winding processes on a forming mandrel subjected to an elevated temperature atmosphere, said strand being maintained under tension and impregnated in about a 70/30 weight ratio of glass to final resin solids with a mixture of polyepoxide resin and amine curing agent therefor curable to a "B" stage at said elevated temperature, said winding being continued until the windings have a thickness in excess of the final spring thickness which is desired;
    (2) maintaining the tension on said strand until said polyepoxide resin has cured to said "B" stage so that said strand is under tension tension in the partially cured product; and
    (3) subjecting said partially cured product to an elevated temperature sufficient to complete the cure of said polyepoxide resin under a pressure of at least 50 p.s.i. to complete the cure and reduce the thickness of said partially cured product to the final desired thickness.

2. A process as recited in claim 1 in which said strand is wound while maintained under a tension of about ¼ pound per filament end in said glass strand.

3. A process as recited in claim 1 in which said glass strand is wound in an atmosphere having a temperature of about 120° F.

4. A process as recited in claim 1 in which said polyepoxide resin is a reaction product of bis-phenol A and epichlorohydrin having an epoxide equivalent in the range of 185–205 and an average molecular weight of 350–400.

5. A proces as recited in claim 4 in which said amine curing agent is aromatic polyamine used in a weight ratio of about 20 parts per 100 parts of said polyepoxide.

6. A process as recited in claim 1 in which said amine curing agent is a mixture comprising metaphenylenediamine and methylene dianiline.

References Cited in the file of this patent

UNITED STATES PATENTS

| | | |
|---|---|---|
| 2,021,276 | Weinhart | Nov. 19, 1935 |
| 2,052,062 | Wallace | Aug. 25, 1936 |
| 2,234,986 | Slayter et al. | Mar. 18, 1941 |
| 2,749,266 | Eldred | June 5, 1956 |
| 2,829,881 | Morris | Apr. 8, 1958 |
| 2,852,424 | Reinhardt et al. | Sept. 16, 1958 |
| 2,980,158 | Meyer | Apr. 18, 1961 |
| 3,033,729 | Shobert | May 8, 1962 |

FOREIGN PATENTS

| | | |
|---|---|---|
| 205,327 | Australia | Jan. 7, 1957 |